United States Patent

[11] 3,626,988

[72] Inventor Edward J. Chu
    Parsippany, N.J.
[21] Appl. No. 875,789
[22] Filed Nov. 12, 1969
[45] Patented Dec. 14, 1971
[73] Assignee Resistoflex Corporation
    Roseland, N.J.

[54] UNBONDED CLOTH REINFORCED BELLOWS AND METHOD OF MANUFACTURE
10 Claims, 5 Drawing Figs.

[52] U.S. Cl. ................................................ 138/121, 138/124
[51] Int. Cl. ........................................................ F16l 11/00
[50] Field of Search ............................................. 138/121, 122, 124, 125, 138, 153, DIG. 3

[56] References Cited
UNITED STATES PATENTS

| | | | |
|---|---|---|---|
| 2,787,289 | 4/1957 | Press | 138/DIG. 3 |
| 3,023,787 | 3/1962 | Phillips | 138/121 |
| 3,245,431 | 4/1966 | Coe | 138/125 |
| 3,275,038 | 9/1966 | Roberts | 138/134 X |
| 3,279,502 | 10/1966 | Waddell | 138/125 X |
| 3,299,417 | 1/1967 | Sibthorpe | 138/121 X |

Primary Examiner—Herbert F. Ross
Attorneys—Ward, McElhannon, Brooks & Fitzpatrick and Robert M. Freeman ABSTRACT: The wall of a chemically resistant bellows is formed from a loosely constructed cloth tube (preferably metallic) surrounding but not bonded to at least an inner tube of a substantially inelastic plastic material such as polytetrafluoroethylene resin. A second resin tube may be disposed over the cloth tube. Substantially nonexpandable rings are disposed externally within the valleys of the corrugations. The cloth may have a flat knit construction. The bellows can be formed by assembling the several tubes, adding the nonexpandable rings, and compressing the assembly axially in a suitable mold while the interior is filled with a medium under pressure.

PATENTED DEC 14 1971 3,626,988
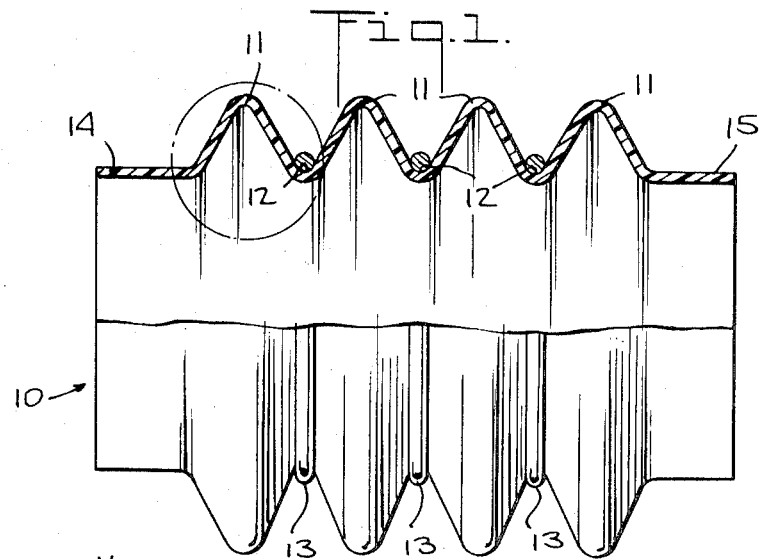
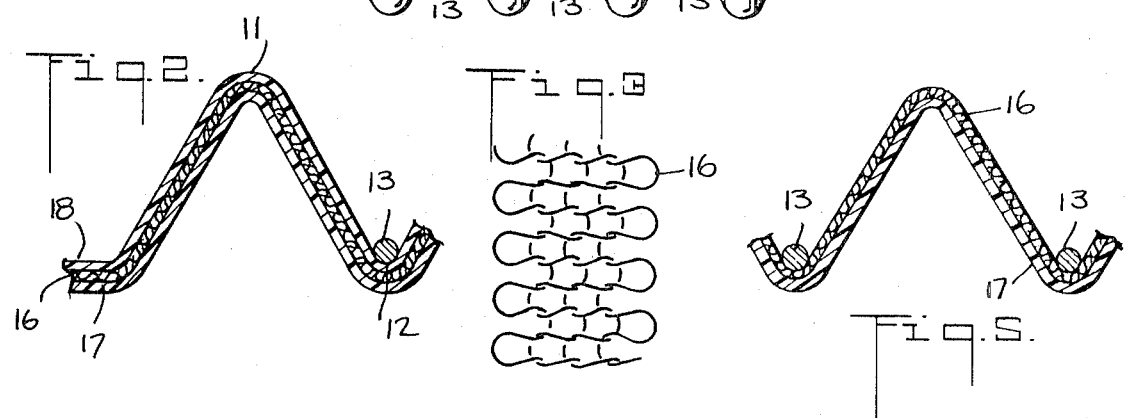
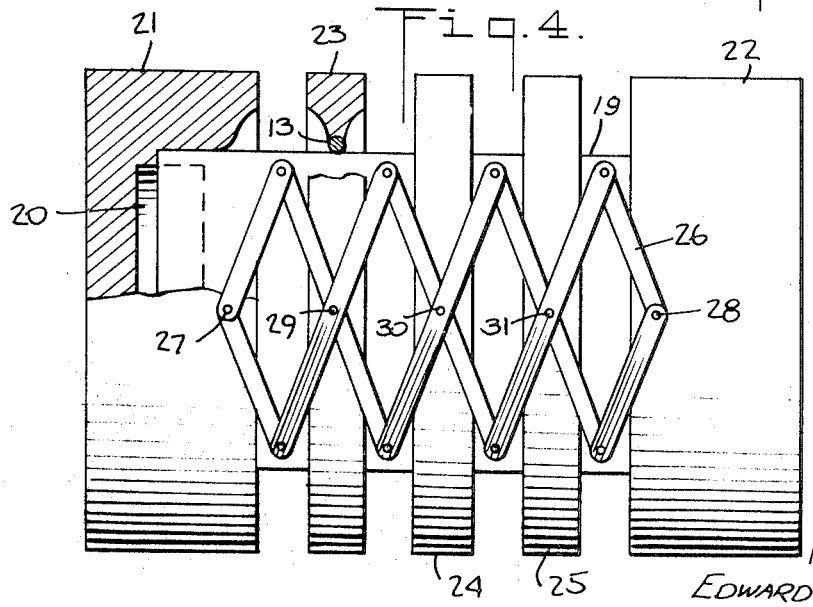
INVENTOR.
EDWARD J. CHU
BY
Watt McClennan Brooks & Fitzpatrick
ATTORNEYS

UNBONDED CLOTH REINFORCED BELLOWS AND METHOD OF MANUFACTURE

The present invention relates to a chemically resistant bellows and to a method for fabricating same.

Chemically resistant bellows find use in expansion joints, flexible couplings, and the like. In particular, where such bellows have been formed from molded polytetrafluoroethylene (P.T.F.E.) resin they have found widespread acceptance in the chemical processing industry and elsewhere.

A number of physical characteristics determine the usefulness of a particular bellows construction. Depending upon the particular installation, use may be made of one or more of the following parameters: travel, also referred to as longitudinal movement or axial compression and extension; misalignment, also referred to as offset or lateral deflection; and angular deflection, sometimes referred to as angular rotation. In addition, it is necessary to take into account the pressure rating or capability of the bellows structure and the effect of temperature thereon. Finally, since the bellows is generally subjected to movement or vibration, the flex life thereof must be considered. Unfortunately, the various parameters are often oppositely affected by changes in construction of the bellows. Hence, any construction usually reflects a compromise.

Because of its chemical inertness, P.T.F.E. resin has become in certain instances an essential material for use in a particular plumbing installation. Heretofore, bellows have been constructed from molded tubes of P.T.F.E. resin reinforced with annular rings in the valleys of the corrugations. It is the purpose of the present invention to provide a bellows structure with substantially increased pressure handling capability while not sacrificing flexibility, flex life, and the other desirable characteristics of bellows structures known heretofore. It is a further purpose of the invention to provide a P.T.F.E. resin bellows of greater reliability than those known heretofore.

In accordance with one aspect of the invention there is provided a chemically resistant bellows comprising an annularly corrugated tubular section characterized in that the wall of the bellows consists of a fluidtight corrugated radially inner tube surrounded by a loosely constructed fluid pervious cloth tube, the latter being maintained in contact with and conforming to the corrugated contour of the former by a substantially nonexpandable ring member disposed in each of the valleys of the corrugated section. In a preferred embodiment the material of the inner tube is P.T.F.E. resin.

In accordance with a further aspect of the invention there is provided a method of forming the aforesaid bellows which comprises the steps of concentrically interfitting at least an inner tube of a substantially inelastic plastic material with a surrounding tube of loosely constructed cloth to provide a composite structure with the tubes fitting closely one within the other, installing one or more substantially nonexpandable rings over the composite structure, and thereafter corrugating the composite structure without causing the several tubes to bond one to the other and with the rings disposed in the valleys of the corrugations.

The invention will be better understood after reading the following detailed description of the presently preferred embodiments thereof with reference to the appended drawings in which:

FIG. 1 is an elevational view in partial section showing an annularly corrugated tubular section formed in accordance with the present invention;

FIG. 2 is an enlarged view of the area within the circle 2 in FIG. 1;

FIG. 3 is a plan view showing the knitted mesh employed in the structure of FIGS. 1 and 2;

FIG. 4 is a diagrammatic view partially in section showing the articulated mold employed in fabricating the bellows section; and FIG. 5 is a view similar to FIG. 2 but showing a modified construction.

Throughout the figures of the drawings the same reference numerals are used to designate the same or similar parts.

Referring now to FIGS. 1, 2 and 3, there is shown a typical annularly corrugated tubular section designated generally by the reference numeral 10. The section is corrugated with a plurality of crests 11 alternating with valleys 12. A nonexpandable metallic ring 13 (e.g., monel metal) is disposed in each of the valleys. For purpose of illustration, the ends 14 and 15 of the corrugated section are shown cylindrical. In one mode of use, metal flanges are installed over each cylindrical end whereupon the end is flared radially outwardly over the face of the flange to provide a gasket face therefor.

As best seen in FIG. 2, the wall of the bellows consists of a loosely constructed cloth tube 16 sandwiched between but not bonded to inner and outer tubes 17 and 18, respectively, of a substantially inelastic plastic material such as sintered P.T.F.E. resin.

A typical loosely constructed cloth is shown in FIG. 3 as consisting of a knitted mesh. It is presently preferred to form such cloth from relatively small diameter metallic wire. In the construction of a 2-inch diameter bellows extremely good results have been obtained with a mesh knitted from 14 strands of 0.0036-inch diameter wire. The wire employed was a type 304 stainless steel. Such cloth has a thickness of approximately 0.027 inch. It will be recognized that the cloth shown in FIG. 3 has a flat knit construction.

Preferably, the inner and outer tubes 17 and 18 each have an individual wall thickness of at least about one-sixteenth of an inch. In the finished structure, substantially no clearance exists between the individual plies. For example, employing plastic tubes having a wall thickness of 0.060 inch and a mesh having a thickness of 0.027 inch the total wall thickness is of the order of 0.152 inch. Allowing for usual variations, it will be appreciated that the plies are in intimate contact.

To provide some indication of the improved characteristics of the new bellows construction, it has been found that a 2-inch diameter bellows constructed in accordance with the teachings herein has a burst strength at approximately 250° F. of about 460 p.s.i. A bellows formed from plastic tubes of identical thickness but omitting the mesh cloth, that is, a bellows having a wall with two plies of 0.060-inch thick plastic tubing and a 2-inch diameter, had a burst strength of 280 p.s.i. under the same conditions. Finally, a bellows with a single layer plastic wall of 0.100 inch in thickness, all other factors remaining the same, burst at 260 p.s.i.

It is presently preferred to form the bellows described above with reference to FIGS. 1, 2, and 3, by first interfitting two tubes of sintered extruded P.T.F.E. resin with a tube of knitted wire mesh to provide a composite structure with the tubes fitting closely one within the other. This structure is then placed within an articulated mold of the type shown generally in FIG. 4. As seen in FIG. 4, the tubular structure is designated by the numeral 19. The interior of the structure is filled with a pressure medium such as P.T.F.E. granules, glass beads, or a suitable hydraulic or gaseous fluid, the ends of the tubular structure being sealed by suitable plugs, one of which is seen at 20.

End caps 21 and 22 are then slipped over the ends of the tubing and plugs after having previously located, around the intermediate portion of the structure 19, the mold rings 23, 24, and 25 which have an internal configuration as shown in the cutaway view of the ring 23. At the radially inner margin there is a groove for receiving the annular reinforcing ring 12.

The lazy tong linkage 26 is pivotally joined to the end caps 21 and 22 by the pins 27 and 28, respectively. In similar manner, the linkage is pivotally joined at 29 to the ring 23, at 30 to the ring 24, and at 31 to the ring 25. A similar linkage is provided on the opposite side of the assembly although not shown in the drawings. The rings 23, 24 and 25 should be split in any convenient manner so that upon removing suitable retaining means they may be disassembled and removed from the tubular structure after it is corrugated.

With the tubular structure 19 mounted in the mold as shown in FIG. 4, the assembly may be placed in an oven to heat the same to the forming temperature which may be of the order of 500° F., or thereabouts. After reaching temperature, the assembly may be placed between the platens of a press and compressed longitudinally. It will be understood that the lazy tong linkage will cause the end caps and intermediate rings of the mold to approach one another uniformly maintaining an equal spacing therebetween at all times until the mold is completely closed. In the process, the tubular structure 19 will be deformed with the corrugations extending radially outwardly between the adjacent rings and end caps of the mold. After quenching, the lazy tong linkages can be removed, along with the end caps and the rings 23, 24 and 25. Because of the corrugations now in structure 19, the rings 23, 24 and 25 can be removed only by disassembling the separate halves. In known manner means (not shown) should be provided for venting or adding hydraulic or gaseous fluid when such constitutes the pressure medium to maintain the pressure thereof substantially constant during the forming operation.

While the process described above is presently preferred, it may be modified while still producing a satisfactory bellows structure. For example, with the interfitted tubes located in the mold and the interior filled with a suitable pressure medium, it is possible to compress the mold longitudinally prior to the heating step thereby cold forming the material. With the mold restrained in its compressed condition, it is then subjected to a heating cycle sufficient to relax the stresses set up in the plastic material during the cold forming step, whereupon it is rapidly cooled or quenched. The corrugated or convoluted structure can now be removed from the mold.

It is also contemplated that the bellows described herein may be fabricated without the use of the special mold described with reference to FIG. 4. While the lazy tong assembly serves to accurately control the location of the mold rings during the forming step, it is possible to dispense with this arrangement. The operation becomes much more critical, but temporary spacers can be employed to locate the reinforcing rings 13 at equally spaced intervals along the interfitted tube structure until the tube structure can be expanded radially sufficiently to lock the rings 13 in relative axial position. Then the spacers are removed and further axial compression of the assembly can take place with the rings 13 serving as the intermediate mold components.

The specific bellows embodiment described above included an outer tube of P.T.F.E. resin surrounding the cloth-reinforcing layer. Where the cloth layer need not be protected against the environment in which the bellows is employed, the outer P.T.F.E. tube may be eliminated as shown in FIG. 5. Thus, the structure shown in FIG. 5 has the fluidtight corrugated radially inner tube 17 of P.T.F.E. resin surrounded by the loosely constructed fluid pervious cloth tube 16, the latter being maintained in contact with and conforming to the corrugated contour of the former by a substantially nonexpandable ring member 13 disposed in each of the valleys of the corrugated section. It is important that the cloth tube be continuous circumferentially and dimensioned such that the crest portion will not expand radially so long as the valley portion is restrained by the rings 13.

The structure shown in FIG. 5 may be formed by the same methods described above with reference to the embodiment of FIG. 2. It will be understood that the complete bellows may have any number of corrugations and suitable end terminations, such as that shown in FIG. 1, for making connections thereto.

In the embodiments described above, the reinforcing metallic fabric was assumed to have been formed by flat knitting. However, loosely woven fabric might also be used satisfactorily. The cloth should be chosen such that the burst strength of the bellows is substantially increased without detracting from the flexibility and flex life of the structure.

As mentioned above, the inner and outer tubes should have a wall thickness of about at least one-sixteenth of an inch. It has been found that with thinner tubes the slight footprint or impression made by the wire cloth embedding in the adjacent surface of the plastic is sufficient to adversely affect the ultimate performance of the bellows. Particularly, where loose strands are present, the thin walls represent an extreme disadvantage since the loose wire can and will penetrate same causing failure.

Another consideration in selecting the cloth is that it be capable of assuming the corrugated configuration during the forming process of the bellows and that it will not adversely interfere with the attachment of suitable end flanges or the like.

Having described the subject invention with reference to the presently preferred embodiment thereof it will be understood that changes may be made in the construction thereof without departing from the true spirit of the invention.

What is claimed is:

1. A chemically resistant bellows comprising an annularly corrugated tubular section characterized in that the wall of the bellows is of multi-ply construction with a loosely constructed cloth tube sandwiched between but not bonded to inner and outer tubes of a substantially inelastic plastic material.

2. A bellows according to claim 1, wherein a substantially nonexpandable ring is disposed externally of the outer tube in each of the valleys of the corrugated section.

3. A bellows according to claim 2, wherein said plastic material is sintered polytetrafluoroethylene resin.

4. A bellows according to claim 3, wherein said cloth is formed from relatively small diameter metallic wire.

5. A bellows according to claim 2, wherein said cloth is formed from relatively small diameter metallic wire.

6. A bellows according to claim 2, wherein said inner and outer tubes each have an individual wall thickness of at least about one-sixteenth inch.

7. A bellows according to claim 2, wherein said cloth is flat knit with metallic strands.

8. A chemically resistant bellows comprising an annularly corrugated tubular section characterized in that the wall of the bellows consists of a fluidtight corrugated radially inner tube of nonmetallic material surrounded by a loosely constructed fluid-pervious cloth tube, the latter being maintained in contact with and conforming to the corrugated contour of the former by a substantially nonexpandable ring member disposed externally thereof in each of the valleys of the corrugated section.

9. A bellows according to claim 8, wherein said cloth is flat knit with metallic strands.

10. A bellows according to claim 9, wherein said nonmetallic material is sintered polytetrafluoroethylene.

* * * * *